US011288494B2

(12) United States Patent
Shannon et al.

(10) Patent No.: US 11,288,494 B2
(45) Date of Patent: Mar. 29, 2022

(54) MONITORING DEVICES AT ENTERPRISE LOCATIONS USING MACHINE-LEARNING MODELS TO PROTECT ENTERPRISE-MANAGED INFORMATION AND RESOURCES

(71) Applicant: Bank of America Corporation, Charlotte, NC (US)

(72) Inventors: Stephen T. Shannon, Charlotte, NC (US); James Alexander, Dripping Springs, TX (US); Brian J. Smith, St. Augustine, FL (US)

(73) Assignee: Bank of America Corporation, Charlotte, NC (US)

( * ) Notice: Subject to any disclaimer, the term of this patent is extended or adjusted under 35 U.S.C. 154(b) by 165 days.

(21) Appl. No.: 16/775,801

(22) Filed: Jan. 29, 2020

(65) Prior Publication Data
US 2021/0232809 A1 Jul. 29, 2021

(51) Int. Cl.
*G06K 9/00* (2022.01)
*G08B 25/01* (2006.01)
*G06K 9/62* (2022.01)
*G06N 20/00* (2019.01)

(52) U.S. Cl.
CPC ....... *G06K 9/00288* (2013.01); *G06K 9/6262* (2013.01); *G06N 20/00* (2019.01); *G08B 25/014* (2013.01)

(58) Field of Classification Search
CPC .......... G06K 9/00288; G06K 9/6262
See application file for complete search history.

(56) References Cited

U.S. PATENT DOCUMENTS

| 7,296,734 | B2 | 11/2007 | Pliha |
| 7,480,631 | B1 | 1/2009 | Merced et al. |
| 8,006,298 | B1 | 8/2011 | Balasubramanian et al. |
| 9,171,306 | B1 | 10/2015 | He et al. |
| 9,269,085 | B2 | 2/2016 | Webb et al. |
| 9,697,521 | B2 | 7/2017 | Webb et al. |
| 9,792,609 | B2 | 10/2017 | Burke et al. |
| 10,270,790 | B1 | 4/2019 | Jackson |
| 2017/0244726 | A1* | 8/2017 | Finkel ................. H04L 63/0428 |
| 2019/0303940 | A1 | 10/2019 | Miller et al. |
| 2020/0007540 | A1* | 1/2020 | Kawaguchi ............. H04W 4/80 |

(Continued)

*Primary Examiner* — Tuan H Nguyen
(74) *Attorney, Agent, or Firm* — Banner & Witcoff, Ltd.

(57) ABSTRACT

Aspects of the disclosure relate to monitoring devices at enterprise locations using machine-learning models to protect enterprise-managed information and resources. In some embodiments, a computing platform may receive, from one or more data source computer systems, passive monitoring data. Based on applying a machine-learning classification model to the passive monitoring data received from the one or more data source computer systems, the computing platform may determine to trigger a data capture process at an enterprise center. In response to determining to trigger the data capture process, the computing platform may initiate an active monitoring process to capture event data at the enterprise center. Thereafter, the computing platform may generate one or more alert messages based on the event data captured at the enterprise center. Then, the computing platform may send the one or more alert messages to one or more enterprise computer systems.

20 Claims, 9 Drawing Sheets

(56) References Cited

U.S. PATENT DOCUMENTS

| | | |
|---|---|---|
| 2020/0026270 A1 | 1/2020 | Cella et al. |
| 2020/0026319 A1 | 1/2020 | Forbes, Jr. |
| 2020/0026394 A1 | 1/2020 | Rodolico et al. |
| 2020/0026555 A1 | 1/2020 | Hammond |
| 2020/0026575 A1 | 1/2020 | Guim Bernat et al. |
| 2020/0026594 A1 | 1/2020 | Steiner et al. |
| 2020/0026636 A1 | 1/2020 | Walenstein et al. |
| 2020/0026708 A1 | 1/2020 | Ahn |
| 2020/0026710 A1 | 1/2020 | Przada et al. |
| 2020/0026732 A1 | 1/2020 | Bequet et al. |
| 2020/0026735 A1 | 1/2020 | Przada et al. |
| 2020/0026772 A1 | 1/2020 | Wheeler |
| 2020/0026783 A1 | 1/2020 | Watanabe et al. |
| 2020/0026784 A1 | 1/2020 | Miyoshi et al. |
| 2020/0026786 A1 | 1/2020 | Cadarette et al. |
| 2020/0026834 A1 | 1/2020 | Vimadalal et al. |
| 2020/0026859 A1 | 1/2020 | Sun et al. |
| 2020/0026863 A1 | 1/2020 | Sartor |
| 2020/0026865 A1 | 1/2020 | Hulick, Jr. |
| 2020/0026871 A1 | 1/2020 | Mikhailov et al. |
| 2020/0026877 A1 | 1/2020 | Dattatri et al. |
| 2020/0027025 A1 | 1/2020 | Rugel et al. |
| 2020/0027026 A1 | 1/2020 | Cook et al. |
| 2020/0027031 A1 | 1/2020 | Sampath et al. |
| 2020/0027096 A1 | 1/2020 | Cooner |
| 2020/0027137 A1 | 1/2020 | Miller et al. |
| 2020/0027162 A1 | 1/2020 | Singh et al. |
| 2020/0027169 A1 | 1/2020 | Valencia |
| 2020/0027187 A1 | 1/2020 | Giladi |
| 2020/0027445 A1 | 1/2020 | Raghunathan et al. |
| 2020/0027531 A1 | 1/2020 | White et al. |
| 2020/0028690 A1 | 1/2020 | Barakat et al. |
| 2020/0028701 A1 | 1/2020 | Liu et al. |
| 2020/0028744 A1 | 1/2020 | Rice et al. |
| 2020/0028745 A1 | 1/2020 | Parkvall et al. |
| 2020/0028771 A1 | 1/2020 | Wong et al. |
| 2020/0028795 A1 | 1/2020 | Tiwary |
| 2020/0028800 A1 | 1/2020 | Strathman et al. |
| 2020/0028849 A1 | 1/2020 | Allen et al. |
| 2020/0028853 A1 | 1/2020 | Ford et al. |
| 2020/0028862 A1 | 1/2020 | Lin et al. |
| 2020/0028871 A1 | 1/2020 | Thayer et al. |
| 2020/0028918 A1 | 1/2020 | Calcaterra et al. |
| 2020/0028925 A1 | 1/2020 | Monge Nunez et al. |
| 2020/0028935 A1 | 1/2020 | Sahay et al. |
| 2020/0028945 A1 | 1/2020 | Allen et al. |
| 2020/0028973 A1 | 1/2020 | Livanos et al. |
| 2020/0028974 A1 | 1/2020 | Chauhan |
| 2020/0029127 A1 | 1/2020 | Garbacz |
| 2020/0029227 A1 | 1/2020 | Misenheimer et al. |

* cited by examiner

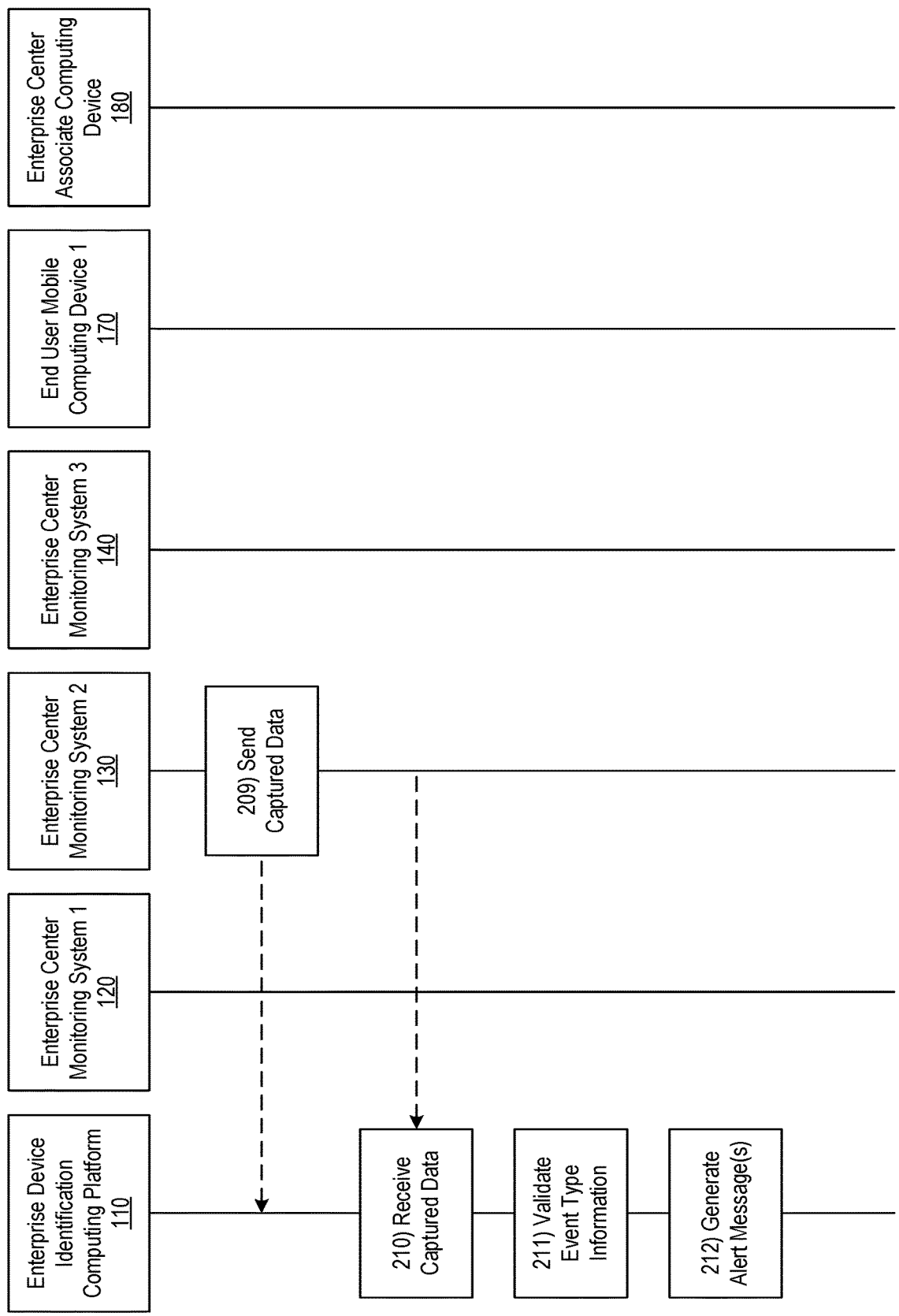

MONITORING DEVICES AT ENTERPRISE LOCATIONS USING MACHINE-LEARNING MODELS TO PROTECT ENTERPRISE-MANAGED INFORMATION AND RESOURCES

BACKGROUND

Aspects of the disclosure relate to deploying digital data processing systems, ensuring information security, and preventing unauthorized access to resources at enterprise locations. In particular, one or more aspects of the disclosure relate to monitoring devices at enterprise locations using machine-learning models to protect enterprise-managed information and resources.

Enterprise organizations may utilize various computing infrastructure to maintain confidential information and/or other sensitive data that is created and/or used for various purposes. Ensuring that this data is secure and only accessible to appropriate users for appropriate purposes may be critically important to protecting the integrity and confidentiality of the underlying information and associated resources. In many instances, it may be difficult to ensure the security and integrity of enterprise-managed information and resources, particularly when also attempting to optimize the resource utilization, bandwidth utilization, and efficient operations of the enterprise computing infrastructure.

SUMMARY

Aspects of the disclosure provide effective, efficient, scalable, and convenient technical solutions that address and overcome the technical problems associated with ensuring information security and preventing unauthorized access by monitoring devices at enterprise locations using machine-learning models to protect enterprise-managed information and resources.

In accordance with one or more embodiments, a computing platform having at least one processor, a communication interface, and memory may receive, via the communication interface, from one or more data source computer systems, passive monitoring data. Subsequently, the computing platform may apply a machine-learning classification model to the passive monitoring data received from the one or more data source computer systems. Based on applying the machine-learning classification model to the passive monitoring data received from the one or more data source computer systems, the computing platform may determine to trigger a data capture process at a first enterprise center. In response to determining to trigger the data capture process at the first enterprise center, the computing platform may initiate an active monitoring process to capture event data at the first enterprise center. Thereafter, the computing platform may generate one or more alert messages based on the event data captured at the first enterprise center. Then, the computing platform may send, via the communication interface, to one or more enterprise computer systems, the one or more alert messages generated based on the event data captured at the first enterprise center.

In some embodiments, applying the machine-learning classification model to the passive monitoring data received from the one or more data source computer systems may include applying the machine-learning classification model to device identification data received from a first enterprise center monitoring system deployed at the first enterprise center.

In some embodiments, applying the machine-learning classification model to the passive monitoring data received from the one or more data source computer systems may include applying the machine-learning classification model to facial recognition data received from the first enterprise center monitoring system deployed at the first enterprise center.

In some embodiments, applying the machine-learning classification model to the passive monitoring data received from the one or more data source computer systems may include applying the machine-learning classification model to internal data received from the first enterprise center monitoring system deployed at the first enterprise center and a second enterprise center monitoring system deployed at a second enterprise center different from the first enterprise center. In addition, the first enterprise center may be operated by a first enterprise organization, and the second enterprise center also may be operated by the first enterprise organization.

In some embodiments, applying the machine-learning classification model to the passive monitoring data received from the one or more data source computer systems may include applying the machine-learning classification model to external data received from a third enterprise center monitoring system deployed at a third enterprise center different from the first enterprise center and the second enterprise center. In addition, the third enterprise center may be operated by a second enterprise organization different from the first enterprise organization.

In some embodiments, determining to trigger the data capture process at the first enterprise center may include prompting an enterprise associate at the first enterprise center to corroborate classification results produced by the machine-learning classification model.

In some embodiments, prompting the enterprise associate at the first enterprise center to corroborate classification results produced by the machine-learning classification model may include prompting the enterprise associate at the first enterprise center to score a current threat level at the first enterprise center on a numerical scale.

In some embodiments, prompting the enterprise associate at the first enterprise center to corroborate classification results produced by the machine-learning classification model may include generating a notification comprising an input request for the enterprise associate at the first enterprise center. Subsequently, the computing platform may send, via the communication interface, to an associate computing device, the notification comprising the input request for the enterprise associate at the first enterprise center. In addition, sending the notification comprising the input request for the enterprise associate at the first enterprise center to the associate computing device may cause the associate computing device to display the notification comprising the input request for the enterprise associate at the first enterprise center.

In some embodiments, prompting the enterprise associate at the first enterprise center to corroborate classification results produced by the machine-learning classification model may include causing an input request for the enterprise associate at the first enterprise center to be displayed on at least one monitoring dashboard user interface presented by an associate computing device.

In some embodiments, prompting the enterprise associate at the first enterprise center to corroborate classification results produced by the machine-learning classification model may include updating the machine-learning classification model based on labeled data received from the enterprise associate at the first enterprise center in response to the prompting.

In some embodiments, initiating the active monitoring process to capture the event data at the first enterprise center may include capturing one or more publicly-transmitted device signatures, capturing publicly-transmitted device properties, and capturing event type information.

In some embodiments, initiating the active monitoring process to capture the event data at the first enterprise center may include capturing image data of a device user in possession of at least one device.

In some embodiments, initiating the active monitoring process to capture the event data at the first enterprise center may include capturing user-added information from at least one associate computing device.

In some embodiments, sending the one or more alert messages generated based on the event data captured at the first enterprise center may include sending the one or more alert messages generated based on the event data captured at the first enterprise center to the one or more enterprise computer systems in real-time as the event data is being captured at the first enterprise center.

In some embodiments, sending the one or more alert messages generated based on the event data captured at the first enterprise center may include sending the one or more alert messages generated based on the event data captured at the first enterprise center to at least one external enterprise computer system associated with a second enterprise organization different from a first enterprise organization that operates the first enterprise center.

In some embodiments, prior to generating the one or more alert messages based on the event data captured at the first enterprise center, the computing platform may validate, based on the event data captured at the first enterprise center, event type information predicted by the machine-learning classification model.

In some embodiments, the computing platform may generate one or more client account notifications based on the event data captured at the first enterprise center. Subsequently, the computing platform may send, via the communication interface, to one or more client computing devices, the one or more client account notifications generated based on the event data captured at the first enterprise center.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for monitoring devices at enterprise locations using machine-learning models to protect enterprise-managed information and resources in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
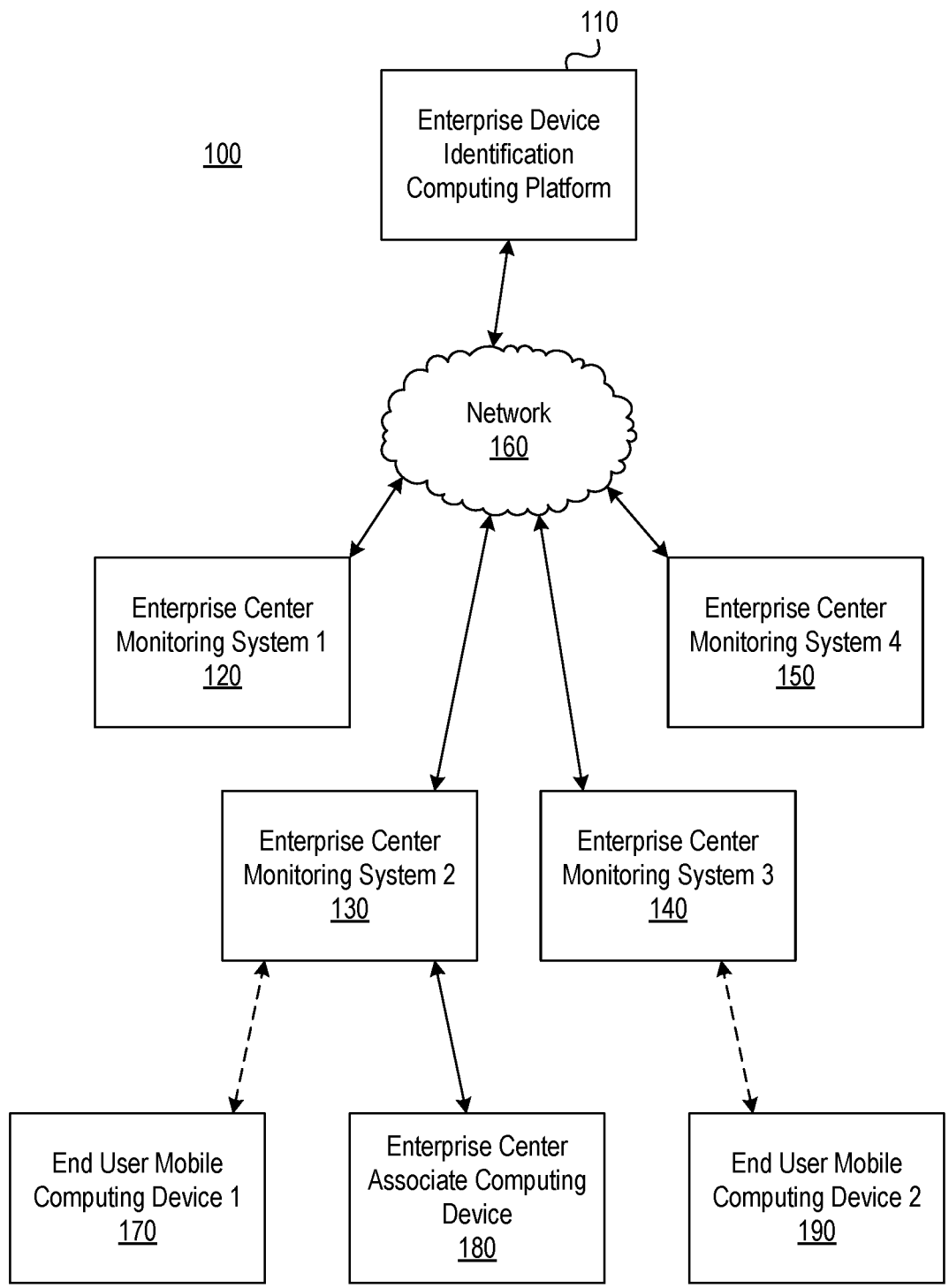
FIGS. 1A and 1B depict an illustrative computing environment for monitoring devices at enterprise locations using machine-learning models to protect enterprise-managed information and resources in accordance with one or more example embodiments.
Figure 1B:
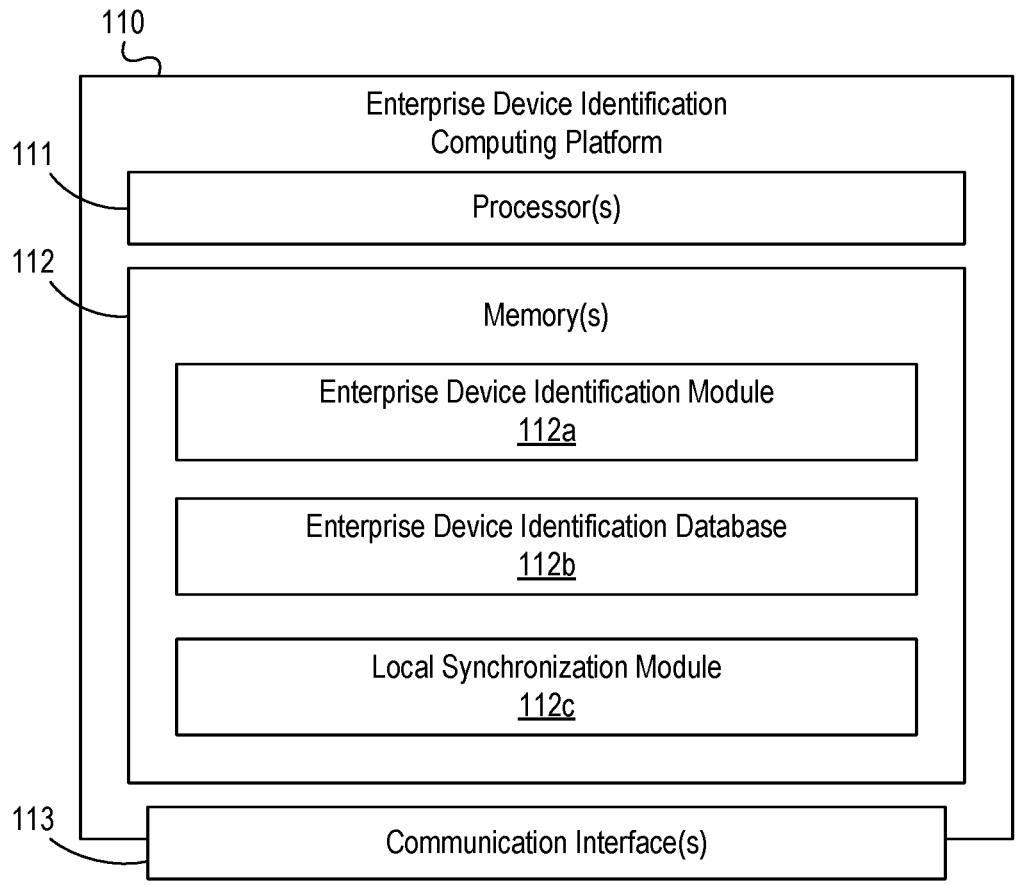

FIGS. 1A and 1B depict an illustrative computing environment for monitoring devices at enterprise locations using machine-learning models to protect enterprise-managed information and resources in accordance with one or more example embodiments. Referring to FIG. 1A, computing environment 100 may include one or more computer systems. For example, computing environment 100 may include an enterprise device identification computing platform 110, a first enterprise center monitoring system 120, a second enterprise center monitoring system 130, a third enterprise center monitoring system 140, a fourth enterprise center monitoring system 150, a first end user mobile computing device 170, an enterprise center associate computing device 180, and a second end user mobile computing device 190.

As illustrated in greater detail below, enterprise device identification computing platform 110 may include one or more computing devices configured to perform one or more of the functions described herein. For example, enterprise device identification computing platform 110 may include one or more computers (e.g., laptop computers, desktop computers, servers, server blades, or the like).

Enterprise center monitoring system 120 may include one or more computing devices and/or other computer components (e.g., processors, memories, communication interfaces). In addition, and as illustrated in greater detail below, enterprise center monitoring system 120 may be configured to receive information from, send information to, and/or otherwise exchange information with one or more devices that are physically present at and/or within a certain range of a first enterprise location (e.g., a banking center, a financial services center, an automated teller machine vestibule, or another enterprise location) at which enterprise center monitoring system 120 may be deployed.

Enterprise center monitoring system 130 may include one or more computing devices and/or other computer components (e.g., processors, memories, communication interfaces). In addition, and as illustrated in greater detail below, enterprise center monitoring system 130 may be configured to receive information from, send information to, and/or otherwise exchange information with one or more devices that are physically present at and/or within a certain range of a second enterprise location (e.g., a banking center, a financial services center, an automated teller machine vestibule, or another enterprise location) at which enterprise center monitoring system 130 may be deployed. The second enterprise location (e.g., where enterprise center monitoring system 130 is deployed) may be remote from and/or different from the first enterprise location (e.g., where enterprise center monitoring system 120 is deployed).

Enterprise center monitoring system 140 may include one or more computing devices and/or other computer components (e.g., processors, memories, communication interfaces). In addition, and as illustrated in greater detail below, enterprise center monitoring system 140 may be configured to receive information from, send information to, and/or otherwise exchange information with one or more devices that are physically present at and/or within a certain range of a third enterprise location (e.g., a banking center, a financial services center, an automated teller machine vestibule, or another enterprise location) at which enterprise center monitoring system 140 may be deployed. The third enterprise location (e.g., where enterprise center monitoring system 140 is deployed) may be remote from and/or different from the first enterprise location (e.g., where enterprise center monitoring system 120 is deployed) and the second enterprise location (e.g., where enterprise center monitoring system 130 is deployed).

Enterprise center monitoring system 150 may include one or more computing devices and/or other computer components (e.g., processors, memories, communication interfaces). In addition, and as illustrated in greater detail below, enterprise center monitoring system 150 may be configured to receive information from, send information to, and/or otherwise exchange information with one or more devices that are physically present at and/or within a certain range of a fourth enterprise location (e.g., a banking center, a financial services center, an automated teller machine vestibule, or another enterprise location) at which enterprise center monitoring system 150 may be deployed. The fourth enterprise location (e.g., where enterprise center monitoring system 150 is deployed) may be remote from and/or different from the first enterprise location (e.g., where enterprise center monitoring system 120 is deployed), the second enterprise location (e.g., where enterprise center monitoring system 130 is deployed), and the third enterprise location (e.g., where enterprise center monitoring system 140 is deployed).

In some arrangements, enterprise center monitoring system 120 and enterprise center monitoring system 130 may be owned and/or operated by a first enterprise organization, and/or enterprise center monitoring system 120 and enterprise center monitoring system 130 may be deployed an enterprise centers that are owned and/or operated by the first enterprise organization. In addition, enterprise center monitoring system 140 and enterprise center monitoring system 150 may be owned and/or operated by a second enterprise organization different from the first enterprise organization, and/or enterprise center monitoring system 140 and enterprise center monitoring system 150 may be deployed an enterprise centers that are owned and/or operated by the second enterprise organization. As illustrated in greater detail below, some aspects of the disclosure may provide technical benefits that are not found in conventional systems, because passive monitoring data and/or active monitoring data captured by various enterprise monitoring systems (e.g., enterprise center monitoring system 120, enterprise center monitoring system 130, enterprise center monitoring system 140, and/or enterprise center monitoring system 150) may be shared, processed, analyzed, and/or otherwise used (e.g., by enterprise device identification computing platform 110) across different enterprise organizations.

End user mobile computing device 170 may be a mobile computing device (e.g., smartphone, tablet, smart watch, laptop computer, or the like). In addition, end user mobile computing device 170 may be linked to and/or used by a first user (who may, e.g., be a customer or other individual visiting an enterprise location, such as the first enterprise location where enterprise center monitoring system 120 may be deployed or the second enterprise location where enterprise center monitoring system 130 may be deployed). End user mobile computing device 190 also may be a mobile computing device (e.g., smartphone, tablet, smart watch, laptop computer, or the like). In addition, end user mobile computing device 190 may be linked to and/or used by a second user (who may, e.g., be a customer or other individual visiting an enterprise location, such as the third enterprise location where enterprise center monitoring system 140 may be deployed) different from the first user.

Enterprise center associate computing device 180 may be a mobile computing device (e.g., smartphone, tablet, smart watch, laptop computer, or the like) or desktop computing device (e.g., desktop computer, terminal, or the like). In addition, enterprise center associate computing device 180 may be linked to and/or used by one or more enterprise users (who may, e.g., be employees of an enterprise organization operating the enterprise center where enterprise center associate computing device 180 is deployed and/or used). For instance, enterprise center associate computing device 180 may be deployed at an enterprise center, such as the enterprise center where enterprise center monitoring system 130 is deployed, so that enterprise center associate computing device 180 may be used by one or more employees of an enterprise organization operating the enterprise center when such employees are assisting customers and/or other visitors to the enterprise center. For example, enterprise center associate computing device 180 may store and/or execute one or more enterprise applications, such as account creation and management applications, transaction history applications, lending applications, brokerage applications, and/or other applications, which may be used by the one or more enterprise users of enterprise center associate computing device 180.

Computing environment 100 also may include one or more networks, which may interconnect one or more of enterprise device identification computing platform 110, enterprise center monitoring system 120, enterprise center monitoring system 130, enterprise center monitoring system 140, enterprise center monitoring system 150, end user mobile computing device 170, enterprise center associate computing device 180, and end user mobile computing device 190. For example, computing environment 100 may include a network 160 (which may, e.g., interconnect enterprise device identification computing platform 110, enterprise center monitoring system 120, enterprise center monitoring system 130, enterprise center monitoring system 140, enterprise center monitoring system 150, and/or one or more other systems which may be associated with an enterprise organization, such as a financial institution, with one or more other systems, public networks, sub-networks, and/or the like).

In one or more arrangements, enterprise device identification computing platform 110, enterprise center monitoring system 120, enterprise center monitoring system 130, enterprise center monitoring system 140, enterprise center monitoring system 150, end user mobile computing device 170, enterprise center associate computing device 180, and end user mobile computing device 190 may be any type of computing device capable of receiving a user interface, receiving input via the user interface, and communicating the received input to one or more other computing devices. For example, enterprise device identification computing platform 110, enterprise center monitoring system 120, enterprise center monitoring system 130, enterprise center monitoring system 140, enterprise center monitoring system 150, end user mobile computing device 170, enterprise center associate computing device 180, end user mobile computing device 190, and/or the other systems included in computing environment 100 may, in some instances, include one or more processors, memories, communication interfaces, storage devices, and/or other components. As noted above, and as illustrated in greater detail below, any and/or all of enterprise device identification computing platform 110, enterprise center monitoring system 120, enterprise center monitoring system 130, enterprise center monitoring system 140, enterprise center monitoring system 150, end user mobile computing device 170, enterprise center associate computing device 180, and end user mobile computing device 190 may, in some instances, be special-purpose computing devices configured to perform specific functions.

Referring to FIG. 1B, enterprise device identification computing platform 110 may include one or more processor(s) 111, memory(s) 112, and communication interface(s) 113. A data bus may interconnect processor 111, memory 112, and communication interface 113. Communication interface 113 may be a network interface configured to support communication between enterprise device identification computing platform 110 and one or more networks (e.g., network 160 or the like). Memory 112 may include one or more program modules having instructions that when executed by processor 111 cause enterprise device identification computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of enterprise device identification computing platform 110 and/or by different computing devices that may form and/or otherwise make up enterprise device identification computing platform 110. For example, memory 112 may have, store, and/or include an enterprise device identification module 112a, an enterprise device identification database 112b, and a local synchronization module 112c. Enterprise device identification module 112a may have instructions that direct and/or cause enterprise device identification computing platform 110 to monitor devices at enterprise locations using machine-learning models to protect enterprise-managed information and resources, as discussed in greater detail below. Enterprise device identification database 112b may store information used by enterprise device identification module 112a and/or enterprise device identification computing platform 110 in monitoring devices at enterprise locations using machine-learning models to protect enterprise-managed information and resources. Local synchronization module 112c may have instructions that direct and/or cause enterprise device identification computing platform 110 to synchronize device information (which may, e.g., include device signatures and/or other information associated with devices detected at various enterprise locations) with various enterprise center monitoring systems (e.g., enterprise center monitoring system 120, enterprise center monitoring system 130, enterprise center monitoring system 140, enterprise center monitoring system 150) which may be deployed at various enterprise locations and/or other systems.

Figure 2A:
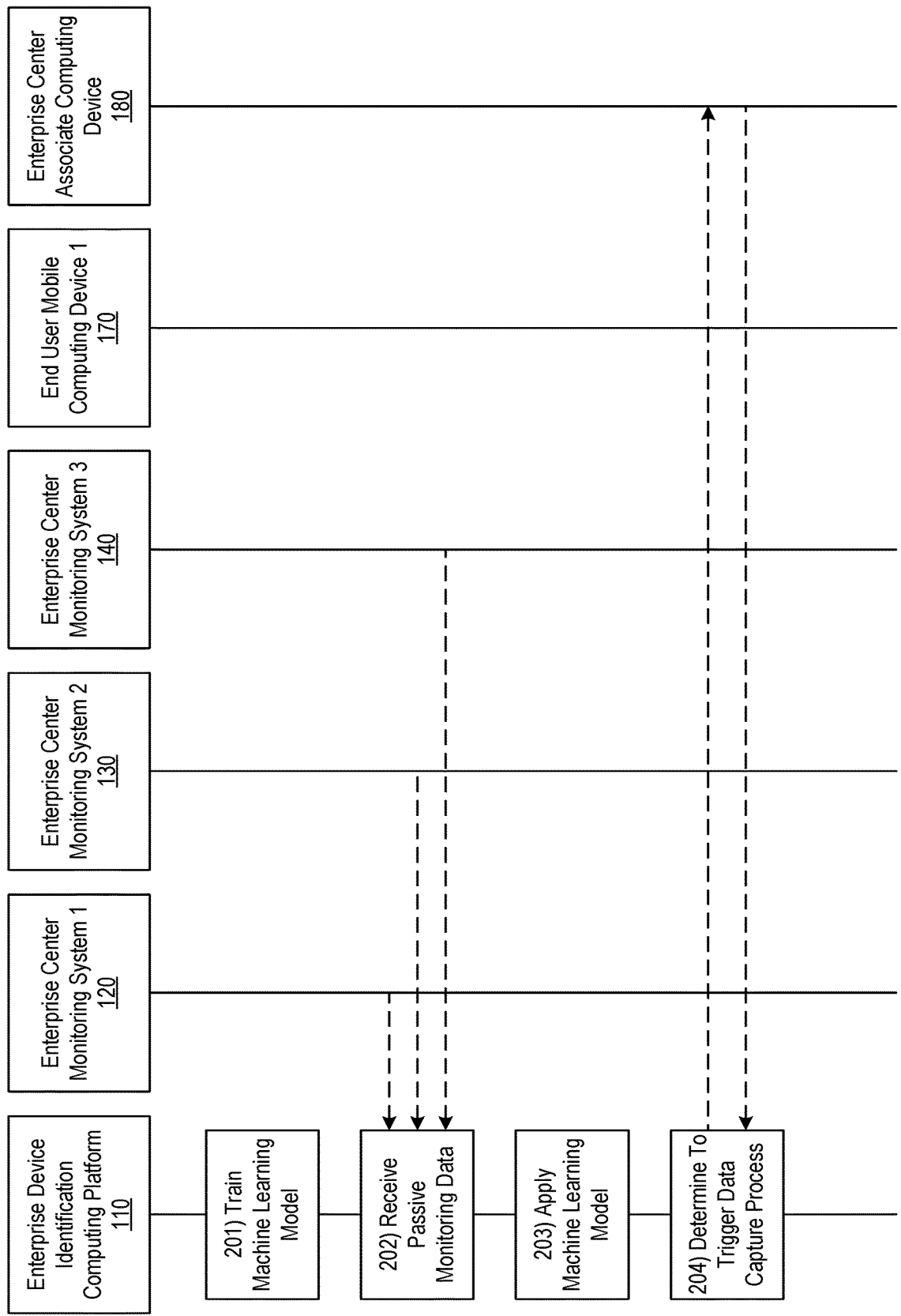

FIGS. 2A-2D depict an illustrative event sequence for monitoring devices at enterprise locations using machine-learning models to protect enterprise-managed information and resources in accordance with one or more example embodiments. Referring to FIG. 2A, at step 201, enterprise device identification computing platform 110 may train a machine learning model. For example, at step 201, enterprise device identification computing platform 110 may train a machine-learning classification model based on a labeled dataset. For instance, enterprise device identification computing platform 110 may receive a labeled dataset identifying features associated with legitimate monitoring information (e.g., normal, non-suspicious activity) and/or features associated with non-legitimate monitoring information (e.g., unusual, suspicious activity). Such monitoring information may, for instance, indicate specific events occurring at various enterprise centers and/or other locations, specific transactions occurring on specific accounts and/or specific types of accounts, and/or other enterprise activity information, as well as labels indicating whether such events, transactions, and/or activity are correlated with normal, non-suspicious activity or unusual, suspicious activity. Subsequently, enterprise device identification computing platform 110 may process the labeled dataset (e.g., using a machine learning engine and/or machine learning application programming interface (API)) to create, train, and/or otherwise generate the machine-learning classification model based on the labeled dataset.

At step 202, enterprise device identification computing platform 110 may receive passive monitoring data (e.g., from enterprise center monitoring system 120, enterprise center monitoring system 130, enterprise center monitoring system 140, and/or one or more other data sources). For example, at step 202, enterprise device identification computing platform 110 may receive, via the communication interface (e.g., communication interface 113), from one or more data source computer systems (e.g., from enterprise center monitoring system 120, enterprise center monitoring system 130, enterprise center monitoring system 140, and/or one or more other data sources), passive monitoring data. The passive monitoring data may, for instance, include event data, transaction data, and/or activity data that is transmitted by and/or received from internal event feeds (e.g., feeds originating from sources within the enterprise organization), external event feeds (e.g., feeds originating from sources outside of the enterprise organization), internal enterprise center monitoring systems (e.g., monitoring systems within the enterprise organization), external enterprise center monitoring systems (e.g., monitoring systems outside of the enterprise organization), internal transaction monitoring systems (e.g., transaction monitoring systems within the enterprise organization), external transaction monitoring systems (e.g., transaction monitoring systems outside of the enterprise organization), and/or other sources. The event data may, for instance, identify specific events occurring at specific enterprise locations (e.g., visits by specific customers and/or other individuals). The transaction data may, for instance, identify specific transactions being conducted on accounts owned by specific customers and/or other individuals. The activity data may, for instance, identify specific activity occurring at specific enterprise locations, such as specific employee activity, specific customer activity, and/or other activity at a given location.

At step 203, enterprise device identification computing platform 110 may apply a machine learning model to the passive monitoring data. For example, at step 203, enterprise device identification computing platform 110 may apply a machine-learning classification model to the passive monitoring data received from the one or more data source computer systems. For instance, enterprise device identification computing platform 110 may apply the classification model trained at step 201 to return one or more results indicating whether current conditions in the passive monitoring data (e.g., current events, transactions, activity, or the like) are normal/non-suspicious or unusual/suspicious. In applying the classification model to the passive monitoring data, enterprise device identification computing platform 110 may compute a score within the range of 0 to 1, where 0 represents fully normal, non-suspicious activity and 1 represents fully unusual, suspicious activity, based on the distance(s) between the passive monitoring data and corresponding features of the machine learning model.

In some embodiments, applying the machine-learning classification model to the passive monitoring data received from the one or more data source computer systems may include applying the machine-learning classification model to device identification data received from a first enterprise center monitoring system deployed at the first enterprise center. For example, in applying the machine-learning classification model to the passive monitoring data received from the one or more data source computer systems (e.g., enterprise center monitoring system 120, enterprise center monitoring system 130, enterprise center monitoring system 140) at step 203, enterprise device identification computing platform 110 may apply the machine-learning classification model to device identification data received from a first enterprise center monitoring system (e.g., enterprise center monitoring system 130) deployed at the first enterprise center. For instance, the device identification data received from the first enterprise center monitoring system (e.g., enterprise center monitoring system 130) deployed at the first enterprise center may include a list of devices (e.g., device signatures, unique device IDs, device types, device operating systems, and/or other device properties) that are currently present at and/or have been recently detected at the first enterprise center.

In some embodiments, applying the machine-learning classification model to the passive monitoring data received from the one or more data source computer systems may include applying the machine-learning classification model to facial recognition data received from the first enterprise center monitoring system deployed at the first enterprise center. For example, in applying the machine-learning classification model to the passive monitoring data received from the one or more data source computer systems (e.g., enterprise center monitoring system 120, enterprise center monitoring system 130, enterprise center monitoring system 140) at step 203, enterprise device identification computing platform 110 may apply the machine-learning classification model to facial recognition data received from the first enterprise center monitoring system (e.g., enterprise center monitoring system 130) deployed at the first enterprise center. For instance, the facial recognition data received from the first enterprise center monitoring system (e.g., enterprise center monitoring system 130) deployed at the first enterprise center may include image data captured by enterprise center monitoring system 130 and/or processed data correlating recognized faces of people present at the first enterprise center with employees, registered and/or otherwise opted-in customers, and/or other known individuals.

In some embodiments, applying the machine-learning classification model to the passive monitoring data received from the one or more data source computer systems may include applying the machine-learning classification model to internal data received from the first enterprise center monitoring system deployed at the first enterprise center and a second enterprise center monitoring system deployed at a second enterprise center different from the first enterprise center, where the first enterprise center is operated by a first enterprise organization, and the second enterprise center is also operated by the first enterprise organization. For example, in applying the machine-learning classification model to the passive monitoring data received from the one or more data source computer systems (e.g., enterprise center monitoring system 120, enterprise center monitoring system 130, enterprise center monitoring system 140) at step 203, enterprise device identification computing platform 110 may apply the machine-learning classification model to internal data received from the first enterprise center monitoring system (e.g., enterprise center monitoring system 130) deployed at the first enterprise center and a second enterprise center monitoring system (e.g., enterprise center monitoring system 120) deployed at a second enterprise center different from the first enterprise center, where the first enterprise center is operated by a first enterprise organization, and the second enterprise center is also operated by the first enterprise organization.

In some embodiments, applying the machine-learning classification model to the passive monitoring data received from the one or more data source computer systems may include applying the machine-learning classification model to external data received from a third enterprise center monitoring system deployed at a third enterprise center different from the first enterprise center and the second enterprise center, where the third enterprise center is operated by a second enterprise organization different from the first enterprise organization. For example, in applying the machine-learning classification model to the passive monitoring data received from the one or more data source computer systems (e.g., enterprise center monitoring system 120, enterprise center monitoring system 130, enterprise center monitoring system 140) at step 203, enterprise device identification computing platform 110 may apply the machine-learning classification model to external data received from a third enterprise center monitoring system (e.g., enterprise center monitoring system 140) deployed at a third enterprise center different from the first enterprise center and the second enterprise center, where the third enterprise center is operated by a second enterprise organization different from the first enterprise organization. For instance, enterprise center monitoring system 140 and enterprise center monitoring system 150 may be owned by, operated by, and/or deployed at enterprise centers that are operated by a different enterprise organization (e.g., a different financial institution) than the enterprise organization that operates the enterprise centers at which enterprise center monitoring system 120 and enterprise center monitoring system 130 are deployed.

At step 204, enterprise device identification computing platform 110 may determine to trigger a data capture process. For example, at step 204, based on applying the machine-learning classification model to the passive monitoring data received from the one or more data source computer systems (e.g., enterprise center monitoring system 120, enterprise center monitoring system 130, enterprise center monitoring system 140), enterprise device identification computing platform 110 may determine to trigger a data capture process at a first enterprise center. For instance, enterprise device identification computing platform 110 may determine to trigger the data capture process at the first enterprise center in response to the machine-learning classification model identifying one or more positive hits and/or trigger features being present in the passive monitoring data received from enterprise center monitoring system 120, enterprise center monitoring system 130, enterprise center monitoring system 140, and/or other data source systems.

In some embodiments, determining to trigger the data capture process at the first enterprise center may include prompting an enterprise associate at the first enterprise center to corroborate classification results produced by the machine-learning classification model. For example, in determining to trigger the data capture process at the first enterprise center at step 204, enterprise device identification computing platform 110 may prompt an enterprise associate at the first enterprise center to corroborate classification results produced by the machine-learning classification model. For instance, in prompting the enterprise associate at the first enterprise center to corroborate the classification results produced by the machine-learning classification model, enterprise device identification computing platform 110 may ask the associate to provide input confirming a normal/non-suspicious label determined by the machine-learning classification model or an unusual/suspicious label determined by the machine-learning classification model.

Figure 3:
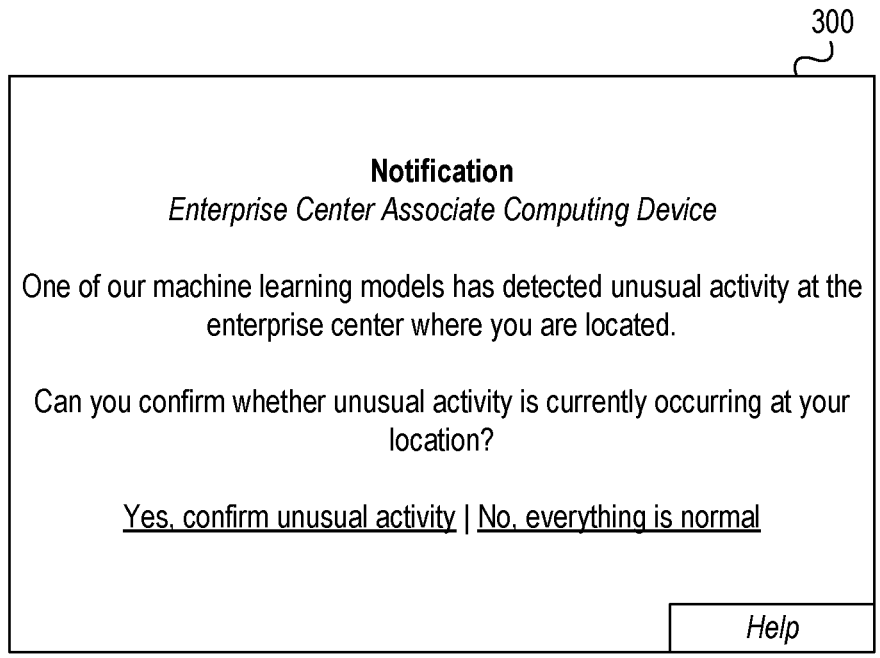
FIGS. 3-6 depict example graphical user interfaces for monitoring devices at enterprise locations using machine-learning models to protect enterprise-managed information and resources in accordance with one or more example embodiments.

Additionally or alternatively, in prompting the enterprise associate at the first enterprise center to corroborate the classification results produced by the machine-learning classification model, enterprise device identification computing platform 110 may generate and/or send information to a device linked to the associate (e.g., enterprise center associate computing device 180) which may cause enterprise center associate computing device 180 to generate, display, and/or otherwise present a graphical user interface similar to graphical user interface 300, which is illustrated in FIG. 3. As seen in FIG. 3, graphical user interface 300 may include text and/or other information indicating the classification results produced by the machine-learning classification model (e.g., "One of our machine learning models has detected unusual activity at the enterprise center where you are located. Can you confirm whether unusual activity is currently occurring at your location?") as well as one or more user-selectable controls allowing the user of enterprise center associate computing device 180 to corroborate the classification results (e.g., "Yes, confirm unusual activity No, everything is normal").

In some embodiments, prompting the enterprise associate at the first enterprise center to corroborate classification results produced by the machine-learning classification model may include prompting the enterprise associate at the first enterprise center to score a current threat level at the first enterprise center on a numerical scale. For example, in prompting the enterprise associate at the first enterprise center to corroborate classification results produced by the machine-learning classification model, enterprise device identification computing platform 110 may prompt the enterprise associate at the first enterprise center to score a current threat level at the first enterprise center on a numerical scale. For instance, in prompting the enterprise associate at the first enterprise center to score the current threat level at the first enterprise center on a numerical scale, enterprise device identification computing platform 110 may ask the associate to provide input indicating a numerical score indicative of a subjective risk level that they are currently experiencing at the first enterprise center.

Figure 4:
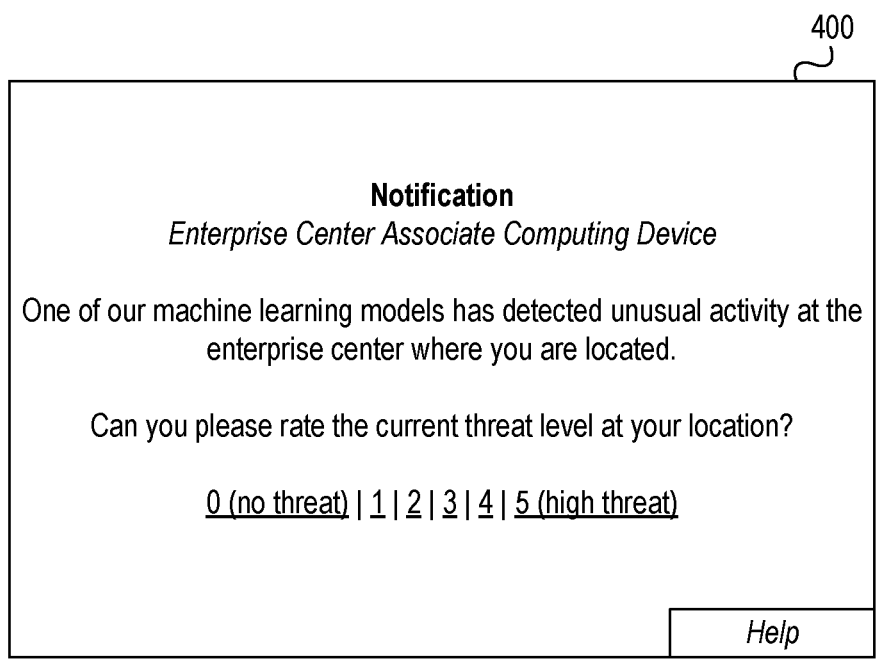

Additionally or alternatively, in prompting the enterprise associate at the first enterprise center to score the current threat level at the first enterprise center on a numerical scale, enterprise device identification computing platform 110 may generate and/or send information to a device linked to the associate (e.g., enterprise center associate computing device 180) which may cause enterprise center associate computing device 180 to generate, display, and/or otherwise present a graphical user interface similar to graphical user interface 400, which is illustrated in FIG. 4. As seen in FIG. 4, graphical user interface 400 may include text and/or other information indicating the classification results produced by the machine-learning classification model (e.g., "One of our machine learning models has detected unusual activity at the enterprise center where you are located. Can you please rate the current threat level at your location?") as well as one or more user-selectable controls allowing the user of enterprise center associate computing device 180 to score the current threat level (e.g., "0 (no threat)|1|2|3|4|5 (high threat)").

In some embodiments, prompting the enterprise associate at the first enterprise center to corroborate classification results produced by the machine-learning classification model may include generating a notification comprising an input request for the enterprise associate at the first enterprise center; and sending, via the communication interface, to an associate computing device, the notification comprising the input request for the enterprise associate at the first enterprise center, where sending the notification comprising the input request for the enterprise associate at the first enterprise center to the associate computing device causes the associate computing device to display the notification comprising the input request for the enterprise associate at the first enterprise center. For example, in prompting the enterprise associate at the first enterprise center to corroborate classification results produced by the machine-learning classification model, enterprise device identification computing platform 110 may generate a notification comprising an input request for the enterprise associate at the first enterprise center. Additionally, enterprise device identification computing platform 110 may send, via the communication interface (e.g., communication interface 113), to an associate computing device (e.g., enterprise center associate computing device 180), the notification comprising the input request for the enterprise associate at the first enterprise center. Furthermore, sending the notification comprising the input request for the enterprise associate at the first enterprise center to the associate computing device (e.g., enterprise center associate computing device 180) may cause the associate computing device (e.g., enterprise center associate computing device 180) to display the notification comprising the input request for the enterprise associate at the first enterprise center. For instance, enterprise device identification computing platform 110 may generate and send a notification to enterprise center associate computing device 180 that causes enterprise center associate computing device 180 to display the notification and/or one or more of the example graphical user interfaces discussed above (e.g., graphical user interface 300, graphical user interface 400).

In some embodiments, prompting the enterprise associate at the first enterprise center to corroborate classification results produced by the machine-learning classification model may include causing an input request for the enterprise associate at the first enterprise center to be displayed on at least one monitoring dashboard user interface presented by an associate computing device. For example, in prompting the enterprise associate at the first enterprise center to corroborate classification results produced by the machine-learning classification model, enterprise device identification computing platform 110 may cause an input request for the enterprise associate at the first enterprise center to be displayed on at least one monitoring dashboard user interface presented by an associate computing device (e.g., enterprise center associate computing device 180). For instance, in causing the input request for the enterprise associate at the first enterprise center to be displayed on the at least one monitoring dashboard user interface presented by enterprise center associate computing device 180, enterprise device identification computing platform 110 may generate and send one or more pages of an internal enterprise monitoring dashboard, which may include information indicating the current operating status of various enterprise systems, current enterprise security information, other alerts that were previously and/or recently generated by enterprise device identification computing platform 110, and/or other information, in addition to the prompt currently being posed by enterprise device identification computing platform 110.

In some embodiments, prompting the enterprise associate at the first enterprise center to corroborate classification results produced by the machine-learning classification model may include updating the machine-learning classification model based on labeled data received from the enterprise associate at the first enterprise center in response to the prompting. For example, in prompting the enterprise associate at the first enterprise center to corroborate classification results produced by the machine-learning classification model, enterprise device identification computing platform 110 may update the machine-learning classification model based on labeled data received from the enterprise associate at the first enterprise center in response to the prompting. For instance, enterprise device identification computing platform 110 may update the machine-learning classification model based on labeled data received from enterprise center associate computing device 180 confirming, not confirming, scoring, and/or otherwise evaluating the accuracy of the determination made by the machine-learning classification model at step 203.

Figure 2B:
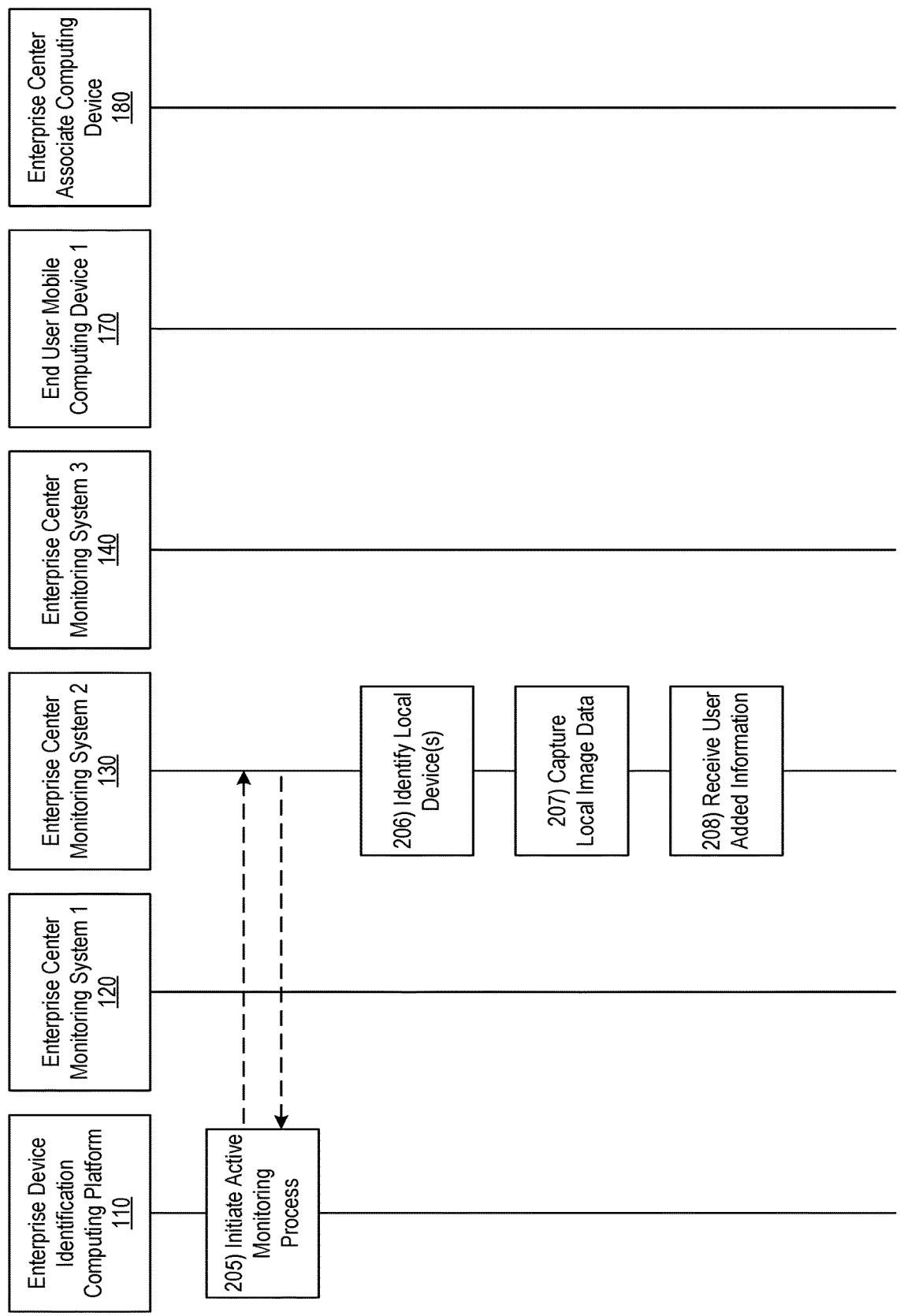

Referring to FIG. 2B, at step 205, enterprise device identification computing platform 110 may initiate an active monitoring process. For example, at step 205, in response to determining to trigger the data capture process at the first enterprise center, enterprise device identification computing platform 110 may initiate an active monitoring process to capture event data at the first enterprise center. In initiating the active monitoring process to capture the event data at the first enterprise center, enterprise device identification computing platform 110 may generate and/or send one or more commands to enterprise center monitoring system 130 directing enterprise center monitoring system 130 to capture various types of data, including device signatures, device properties, and/or other event-related information.

In some embodiments, initiating the active monitoring process to capture the event data at the first enterprise center may include capturing one or more publicly-transmitted device signatures, capturing publicly-transmitted device properties, and capturing event type information. For example, in initiating the active monitoring process to capture the event data at the first enterprise center at step 205, enterprise device identification computing platform 110 may capture one or more publicly-transmitted device signatures, publicly-transmitted device properties, and/or event type information. Each device signature may, for instance, include a collection of information that uniquely identifies a particular device. The device properties may include a device identifier (ID), device type information, device operating system information, and/or other device properties. The event type information may, for instance, indicate what type of event is occurring at the first enterprise center (e.g., an attempt to remove physical property and/or currency from the banking center without authorization and/or using force, an attempt to deposit or cash a non-legitimate check or other financial instrument, an attempt to access a financial account without authorization, or the like).

In some embodiments, initiating the active monitoring process to capture the event data at the first enterprise center may include capturing image data of a device user in possession of at least one device. For example, in initiating the active monitoring process to capture the event data at the first enterprise center at step 205, enterprise device identification computing platform 110 may capture image data of a device user in possession of at least one device present at the first enterprise center. For instance, enterprise device identification computing platform 110 may generate and send one or more commands to enterprise center monitoring system 130 directing enterprise center monitoring system 130 to take one or more videos and/or pictures of device users present at the enterprise center, and enterprise device identification computing platform 110 may receive and/or process such videos and/or pictures from enterprise center monitoring system 130 to extract and/or otherwise capture physical information and/or other identifying information associated with such device users.

In some embodiments, initiating the active monitoring process to capture the event data at the first enterprise center may include capturing user-added information from at least one associate computing device. For example, in initiating the active monitoring process to capture the event data at the first enterprise center at step 205, enterprise device identification computing platform 110 may capture user-added information from at least one associate computing device (e.g., enterprise center associate computing device 180). For instance, enterprise device identification computing platform 110 may prompt enterprise center associate computing device 180 to request input from a user identifying current circumstances at the enterprise center, and enterprise device identification computing platform 110 may receive such input from enterprise center associate computing device 180 and store such input as the user-added information.

At step 206, enterprise center monitoring system 130 may identify one or more local devices present at the enterprise center (e.g., end user mobile computing device 170, enterprise center associate computing device 180). In identifying the one or more local devices present at the enterprise center (e.g., end user mobile computing device 170, enterprise center associate computing device 180), enterprise center monitoring system 130 may, for instance, scan and/or interrogate the one or more local devices in response to receiving one or more commands from enterprise device identification computing platform 110 (e.g., directing enterprise center monitoring system 130 to initiate the active monitoring process).

At step 207, enterprise center monitoring system 130 may capture local image data. Such local image data may, for instance, include video and/or still images of one or more device users present at the enterprise center, which may enable enterprise device identification computing platform 110 to perform facial recognition and/or other user recognition functions. At step 208, enterprise center monitoring system 130 may receive user-added information (e.g., from enterprise center associate computing device 180). Such user-added information may, for instance, include input received from an enterprise user (e.g., of enterprise center associate computing device 180) identifying current circumstances at the enterprise center.

Referring to FIG. 2C, at step 209, enterprise center monitoring system 130 may send captured data to enterprise device identification computing platform 110. For instance, at step 209, enterprise center monitoring system 130 may send information identifying the local devices present at the enterprise center, the captured local image data, the user-added information, and/or other information to enterprise device identification computing platform 110.

At step 210, enterprise device identification computing platform 110 may receive captured data from enterprise center monitoring system 130. For instance, at step 210, enterprise device identification computing platform 110 may receive any and/or all of the data captured by enterprise center monitoring system 130 in the examples described above.

At step 211, enterprise device identification computing platform 110 may validate event type information. For example, at step 211, enterprise device identification computing platform 110 may validate, based on the event data captured at the first enterprise center, event type information predicted by the machine-learning classification model. For instance, in validating the event type information predicted by the machine-learning classification model may compare (e.g., and may calculate a deviation amount between) the event type that was predicted by the machine-learning classification model and the event type that is indicated in the captured data received from enterprise center monitoring system 130. Examples of possible event types include an attempt to remove physical property and/or currency from the banking center without authorization and/or using force, an attempt to deposit or cash a non-legitimate check or other financial instrument, an attempt to access a financial account without authorization, or the like.

At step 212, enterprise device identification computing platform 110 may generate one or more alert messages. For example, at step 212, enterprise device identification computing platform 110 may generate one or more alert messages based on the event data captured at the first enterprise center. The one or more alert messages generated by enterprise device identification computing platform 110 may, for instance, include any and/or all of the information captured by enterprise device identification computing platform 110, such as device knowledge information, event type information, device user identifying information (e.g., physical identifying information), event type of information (e.g., indicating what type of transaction and/or event was attempted), user-added information, and/or other information.

Figure 2D:
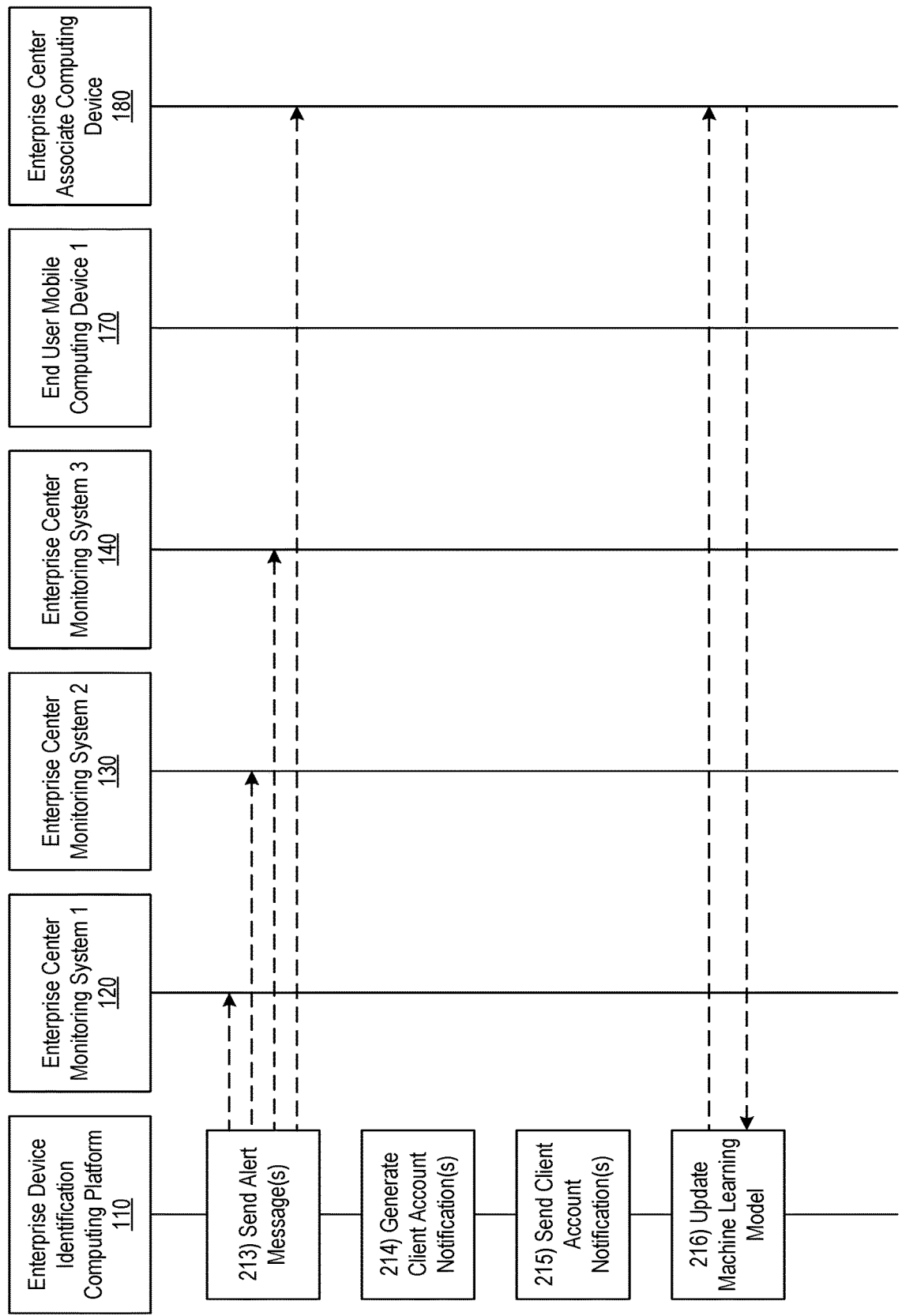
Figure 5:
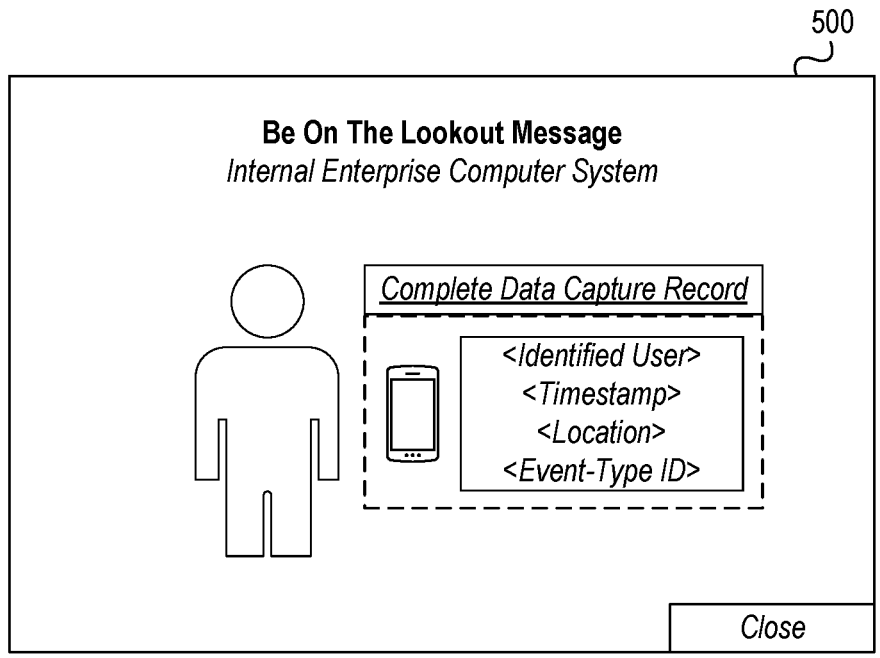

Referring to FIG. 2D, at step 213, enterprise device identification computing platform 110 may send the one or more alert messages. For example, at step 213, enterprise device identification computing platform 110 may send, via the communication interface (e.g., communication interface 113), to one or more enterprise computer systems (e.g., enterprise center monitoring system 120, enterprise center monitoring system 130, enterprise center monitoring system 140, enterprise center associate computing device 180), the one or more alert messages generated based on the event data captured at the first enterprise center. For instance, in sending the one or more alert messages to the one or more enterprise computer systems (e.g., enterprise center monitoring system 120, enterprise center monitoring system 130, enterprise center monitoring system 140, enterprise center associate computing device 180), enterprise device identification computing platform 110 may cause the one or more enterprise computer systems (e.g., enterprise center monitoring system 120, enterprise center monitoring system 130, enterprise center monitoring system 140, enterprise center associate computing device 180) to display and/or otherwise present one or more graphical user interfaces similar to graphical user interface 500, which is illustrated in FIG. 5. As seen in FIG. 5, graphical user interface 500 may include text and/or other information associated with a "be on the lookout" (BOLO) message. The BOLO message illustrated in FIG. 5 may, for instance, be sent by enterprise device identification computing platform 110 to an internal enterprise computer system (e.g., a computer system owned by, operated by, and/or otherwise associated with the same enterprise organization that owns and/or operates enterprise device identification computing platform 110) and thus may include a complete data capture record (e.g., a complete set of information captured by enterprise device identification computing platform 110 in connection with an event at an enterprise center).

Figure 6:
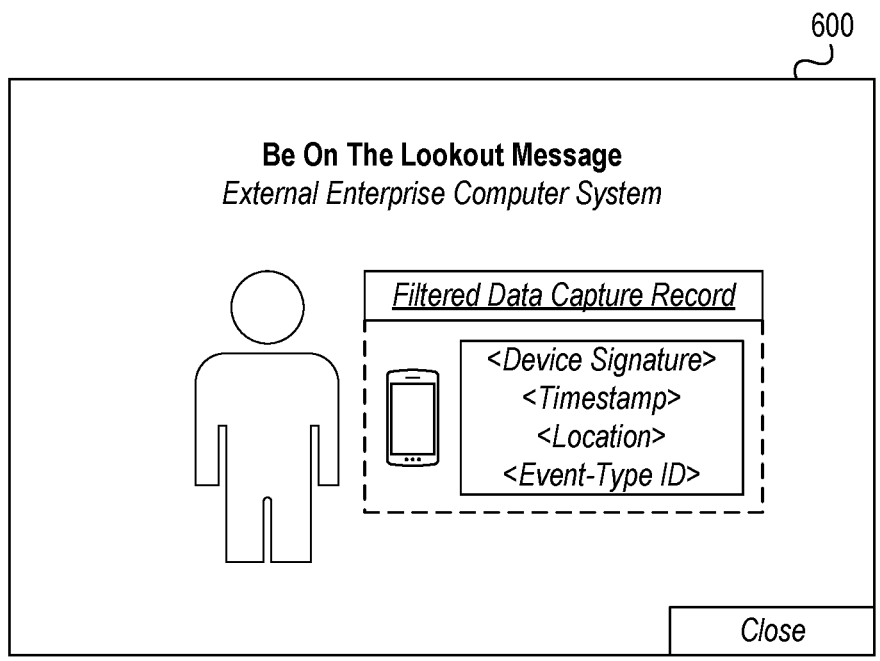

Additionally or alternatively, in sending the one or more alert messages to the one or more enterprise computer systems (e.g., enterprise center monitoring system 120, enterprise center monitoring system 130, enterprise center monitoring system 140, enterprise center associate computing device 180), enterprise device identification computing platform 110 may cause the one or more enterprise computer systems (e.g., enterprise center monitoring system 120, enterprise center monitoring system 130, enterprise center monitoring system 140, enterprise center associate computing device 180) to display and/or otherwise present one or more graphical user interfaces similar to graphical user interface 600, which is illustrated in FIG. 6. As seen in FIG. 6, graphical user interface 600 may include text and/or other information associated with a BOLO message. The BOLO message illustrated in FIG. 6 may, for instance, be sent by enterprise device identification computing platform 110 to an external enterprise computer system (e.g., a computer system that is not owned by, operated by, and/or otherwise associated with the same enterprise organization that owns and/or operates enterprise device identification computing platform 110, and is instead owned by, operated by, and/or otherwise associated with a different enterprise organization) and thus may include a filtered data capture record (e.g., a filtered and/or otherwise incomplete set of information captured by enterprise device identification computing platform 110 in connection with an event at an enterprise center).

In some embodiments, sending the one or more alert messages generated based on the event data captured at the first enterprise center may include sending the one or more alert messages generated based on the event data captured at the first enterprise center to the one or more enterprise computer systems in real-time as the event data is being captured at the first enterprise center. For example, in sending the one or more alert messages generated based on the event data captured at the first enterprise center at step 213, enterprise device identification computing platform 110 may send the one or more alert messages generated based on the event data captured at the first enterprise center to the one or more enterprise computer systems (e.g., enterprise center monitoring system 120, enterprise center monitoring system 130, enterprise center monitoring system 140, enterprise center associate computing device 180) in real-time as the event data is being captured at the first enterprise center. By sending such messages in real-time, enterprise device identification computing platform 110 may, for instance, deliver one or more technical benefits over conventional systems, as enterprise device identification computing platform 110 may provide the enterprise computer systems with relevant information in a timely manner (e.g., substantially concurrent with an event occurring at the first enterprise center).

In some embodiments, sending the one or more alert messages generated based on the event data captured at the first enterprise center may include sending the one or more alert messages generated based on the event data captured at the first enterprise center to at least one external enterprise computer system associated with a second enterprise organization different from a first enterprise organization that operates the first enterprise center. For example, in sending the one or more alert messages generated based on the event data captured at the first enterprise center at step 213, enterprise device identification computing platform 110 may send the one or more alert messages generated based on the event data captured at the first enterprise center to at least one external enterprise computer system associated with a second enterprise organization different from a first enterprise organization that operates the first enterprise center, such as enterprise center monitoring system 140 and enterprise center monitoring system 150 as in the examples described above.

At step 214, enterprise device identification computing platform 110 may generate one or more client account notifications. For example, at step 214, enterprise device identification computing platform 110 may generate one or more client account notifications based on the event data captured at the first enterprise center. Such client account notifications may, for instance, include information notifying one or more account owners about malicious activity affecting their account(s). At step 215, enterprise device identification computing platform 110 may send the one or more client account notifications. For example, at step 215, enterprise device identification computing platform 110 may send, via the communication interface (e.g., communication interface 113), to one or more client computing devices (e.g., one or more computing devices linked to one or more clients of the enterprise organization), the one or more client account notifications generated based on the event data captured at the first enterprise center. By sending the one or more client account notifications to the one or more client computing devices, enterprise device identification computing platform 110 may, for instance, alert one or more customers of an enterprise organization that their account information and/or other private information may be at risk and/or was subject to an attempt at unauthorized access.

At step 216, enterprise device identification computing platform 110 may update the machine-learning classification model. For example, enterprise device identification computing platform 110 may retrain and/or otherwise update the machine-learning classification model based on validation information and/or labeled data received from enterprise center associate computing device 180 and/or one or more other sources (e.g., confirming and/or rejecting one or more determinations made by the machine-learning classification model, including the determination made at step 203 as to whether the conditions were normal/non-suspicious or unusual/suspicious).

Subsequently, enterprise device identification computing platform 110 may repeat one or more steps of the example event sequence discussed above in evaluating monitoring data from the same enterprise center and/or one or more different enterprise centers, using the machine-learning classification model. Additionally or alternatively, enterprise device identification computing platform 110 may initiate one or more active monitoring processes and/or generate and send one or more alert messages, similar to how enterprise device identification computing platform 110 may initiate such processes and generate and send such messages in the examples described above.

Figure 7:
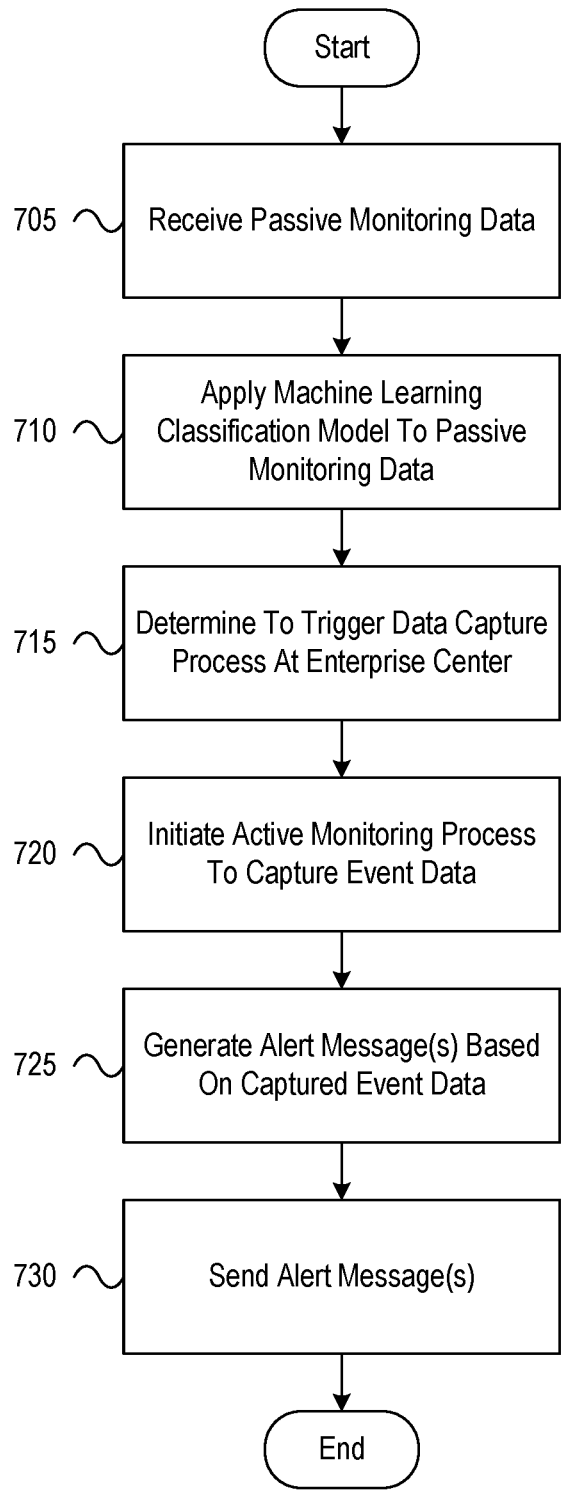
FIG. 7 depicts an illustrative method for monitoring devices at enterprise locations using machine-learning models to protect enterprise-managed information and resources in accordance with one or more example embodiments.

FIG. 7 depicts an illustrative method for monitoring devices at enterprise locations using machine-learning models to protect enterprise-managed information and resources in accordance with one or more example embodiments. Referring to FIG. 7, at step 705, a computing platform having at least one processor, a communication interface, and memory may receive, via the communication interface, from one or more data source computer systems, passive monitoring data. At step 710, the computing platform may apply a machine-learning classification model to the passive monitoring data received from the one or more data source computer systems. At step 715, based on applying the machine-learning classification model to the passive monitoring data received from the one or more data source computer systems, the computing platform may determine to trigger a data capture process at a first enterprise center. At step 720, in response to determining to trigger the data capture process at the first enterprise center, the computing platform may initiate an active monitoring process to capture event data at the first enterprise center. At step 725, the computing platform may generate one or more alert messages based on the event data captured at the first enterprise center. At step 730, the computing platform may send, via the communication interface, to one or more enterprise computer systems, the one or more alert messages generated based on the event data captured at the first enterprise center.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
    at least one processor;
    a communication interface communicatively coupled to the at least one processor; and
    memory storing computer-readable instructions that, when executed by the at least one processor, cause the computing platform to:
        receive, via the communication interface, from one or more data source computer systems, passive monitoring data;
        apply a machine-learning classification model to the passive monitoring data received from the one or more data source computer systems;
        based on applying the machine-learning classification model to the passive monitoring data received from the one or more data source computer systems, determine to trigger a data capture process at a first enterprise center, wherein determining to trigger the data capture process at the first enterprise center comprises prompting an enterprise associate at the first enterprise center to corroborate classification results produced by the machine-learning classification model;
        in response to determining to trigger the data capture process at the first enterprise center, initiate an active monitoring process to capture event data at the first enterprise center;
        generate one or more alert messages based on the event data captured at the first enterprise center; and
        send, via the communication interface, to one or more enterprise computer systems, the one or more alert messages generated based on the event data captured at the first enterprise center.

2. The computing platform of claim 1, wherein applying the machine-learning classification model to the passive monitoring data received from the one or more data source computer systems comprises applying the machine-learning classification model to device identification data received from a first enterprise center monitoring system deployed at the first enterprise center.

3. The computing platform of claim 2, wherein applying the machine-learning classification model to the passive monitoring data received from the one or more data source computer systems comprises applying the machine-learning classification model to facial recognition data received from the first enterprise center monitoring system deployed at the first enterprise center.

4. The computing platform of claim 1, wherein applying the machine-learning classification model to the passive monitoring data received from the one or more data source computer systems comprises applying the machine-learning classification model to internal data received from a first enterprise center monitoring system deployed at the first enterprise center and a second enterprise center monitoring system deployed at a second enterprise center different from the first enterprise center, wherein the first enterprise center is operated by a first enterprise organization, and wherein the second enterprise center is also operated by the first enterprise organization.

5. The computing platform of claim 4, wherein applying the machine-learning classification model to the passive monitoring data received from the one or more data source computer systems comprises applying the machine-learning classification model to external data received from a third enterprise center monitoring system deployed at a third enterprise center different from the first enterprise center and the second enterprise center, and wherein the third enterprise center is operated by a second enterprise organization different from the first enterprise organization.

6. The computing platform of claim 1, wherein prompting the enterprise associate at the first enterprise center to corroborate classification results produced by the machine-learning classification model comprises prompting the enterprise associate at the first enterprise center to score a current threat level at the first enterprise center on a numerical scale.

7. The computing platform of claim 1, wherein prompting the enterprise associate at the first enterprise center to corroborate classification results produced by the machine-learning classification model comprises:
    generating a notification comprising an input request for the enterprise associate at the first enterprise center; and
    sending, via the communication interface, to an associate computing device, the notification comprising the input request for the enterprise associate at the first enterprise center, wherein sending the notification comprising the input request for the enterprise associate at the first enterprise center to the associate computing device causes the associate computing device to display the notification comprising the input request for the enterprise associate at the first enterprise center.

8. The computing platform of claim 1, wherein prompting the enterprise associate at the first enterprise center to corroborate classification results produced by the machine-learning classification model comprises causing an input request for the enterprise associate at the first enterprise center to be displayed on at least one monitoring dashboard user interface presented by an associate computing device.

9. The computing platform of claim 1, wherein prompting the enterprise associate at the first enterprise center to corroborate classification results produced by the machine-learning classification model comprises updating the machine-learning classification model based on labeled data received from the enterprise associate at the first enterprise center in response to the prompting.

10. The computing platform of claim 1, wherein initiating the active monitoring process to capture the event data at the first enterprise center comprises capturing one or more publicly-transmitted device signatures, capturing publicly-transmitted device properties, and capturing event type information.

11. The computing platform of claim 1, wherein initiating the active monitoring process to capture the event data at the first enterprise center comprises capturing image data of a device user in possession of at least one device.

12. The computing platform of claim 1, wherein initiating the active monitoring process to capture the event data at the first enterprise center comprises capturing user-added information from at least one associate computing device.

13. The computing platform of claim 1, wherein sending the one or more alert messages generated based on the event data captured at the first enterprise center comprises sending the one or more alert messages generated based on the event data captured at the first enterprise center to the one or more enterprise computer systems in real-time as the event data is being captured at the first enterprise center.

14. The computing platform of claim 1, wherein sending the one or more alert messages generated based on the event data captured at the first enterprise center comprises sending the one or more alert messages generated based on the event data captured at the first enterprise center to at least one external enterprise computer system associated with a second enterprise organization different from a first enterprise organization that operates the first enterprise center.

15. The computing platform of claim 1, wherein the memory stores additional computer-readable instructions that, when executed by the at least one processor, cause the computing platform to:
   prior to generating the one or more alert messages based on the event data captured at the first enterprise center, validate, based on the event data captured at the first enterprise center, event type information predicted by the machine-learning classification model.

16. The computing platform of claim 1, wherein the memory stores additional computer-readable instructions that, when executed by the at least one processor, cause the computing platform to:
   generate one or more client account notifications based on the event data captured at the first enterprise center; and
   send, via the communication interface, to one or more client computing devices, the one or more client account notifications generated based on the event data captured at the first enterprise center.

17. A method, comprising:
   at a computing platform comprising at least one processor, a communication interface, and memory:
     receiving, by the at least one processor, via the communication interface, from one or more data source computer systems, passive monitoring data;
     applying, by the at least one processor, a machine-learning classification model to the passive monitoring data received from the one or more data source computer systems;
     based on applying the machine-learning classification model to the passive monitoring data received from the one or more data source computer systems, determining, by the at least one processor, to trigger a data capture process at a first enterprise center wherein determining to trigger the data capture process at the first enterprise center comprises prompting an enterprise associate at the first enterprise center to corroborate classification results produced by the machine-learning classification model;
     in response to determining to trigger the data capture process at the first enterprise center, initiating, by the at least one processor, an active monitoring process to capture event data at the first enterprise center;
     generating, by the at least one processor, one or more alert messages based on the event data captured at the first enterprise center; and
     sending, by the at least one processor, via the communication interface, to one or more enterprise computer systems, the one or more alert messages generated based on the event data captured at the first enterprise center.

18. The method of claim 17, wherein applying the machine-learning classification model to the passive monitoring data received from the one or more data source computer systems comprises applying the machine-learning classification model to device identification data received from a first enterprise center monitoring system deployed at the first enterprise center.

19. The method of claim 17, wherein prompting the enterprise associate at the first enterprise center to corroborate classification results produced by the machine-learning classification model comprises prompting the enterprise associate at the first enterprise center to score a current threat level at the first enterprise center on a numerical scale.

20. One or more non-transitory computer-readable media storing instructions that, when executed by a computing platform comprising at least one processor, a communication interface, and memory, cause the computing platform to:
   receive, via the communication interface, from one or more data source computer systems, passive monitoring data;
   apply a machine-learning classification model to the passive monitoring data received from the one or more data source computer systems;
   based on applying the machine-learning classification model to the passive monitoring data received from the one or more data source computer systems, determine to trigger a data capture process at a first enterprise center, wherein determining to trigger the data capture process at the first enterprise center comprises prompting an enterprise associate at the first enterprise center to corroborate classification results produced by the machine-learning classification model;
   in response to determining to trigger the data capture process at the first enterprise center, initiate an active monitoring process to capture event data at the first enterprise center;
   generate one or more alert messages based on the event data captured at the first enterprise center; and
   send, via the communication interface, to one or more enterprise computer systems, the one or more alert messages generated based on the event data captured at the first enterprise center.

* * * * *